United States Patent [19]

Gordon

[11] 4,302,176
[45] Nov. 24, 1981

[54] TUBE EXPANDER

[76] Inventor: William F. Gordon, 56 Lake Ave., Third Lake, Ill. 60046

[21] Appl. No.: 183,018

[22] Filed: Sep. 2, 1980

[51] Int. Cl.³ .............................................. B29D 23/00
[52] U.S. Cl. .................................................... 425/392
[58] Field of Search .................. 425/392, 393, 403; 269/48.1

[56] References Cited

U.S. PATENT DOCUMENTS

| | | |
|---|---|---|
| 544,268 | 8/1895 | Unsinger . |
| 1,748,765 | 2/1930 | Hellermann . |
| 2,236,936 | 4/1941 | Camp ................................... 100/31 |
| 2,422,065 | 6/1947 | Anselmi ................................ 29/235 |
| 2,906,226 | 9/1959 | Myrick ........................... 269/48.1 X |
| 2,931,096 | 5/1960 | Brudney ................................ 29/289 |
| 3,281,927 | 11/1966 | Buslaff .................................. 29/235 |
| 3,553,780 | 1/1971 | Kuhlemann ..................... 425/393 X |
| 3,861,847 | 1/1975 | Barnett ........................... 425/403 X |

*Primary Examiner*—Thomas P. Pavelko
*Attorney, Agent, or Firm*—Robert E. O'Neill

[57] ABSTRACT

A device for expanding flexible tubes and similar elastic articles including a cable, hydraulic or air actuated cam coupled to move projecting fingers for expanding the elastic article. The device includes a housing pivotally mounting two opposed parallel blocks, each of which includes a cam follower surface and a projecting finger. Initially, the spreading finger elements are inserted into a tube or other elastic article and the cam is moved against the cam follower to pivot the blocks away from one another. At that time, the attached fingers also rotate away from one another and act to expand the tube or elastic article. The housing is constructed to enable the cam and drive to be interchanged for cable, hydraulic, or air cylinder actuation.

12 Claims, 5 Drawing Figures

U.S. Patent  Nov. 24, 1981  Sheet 1 of 2  4,302,176
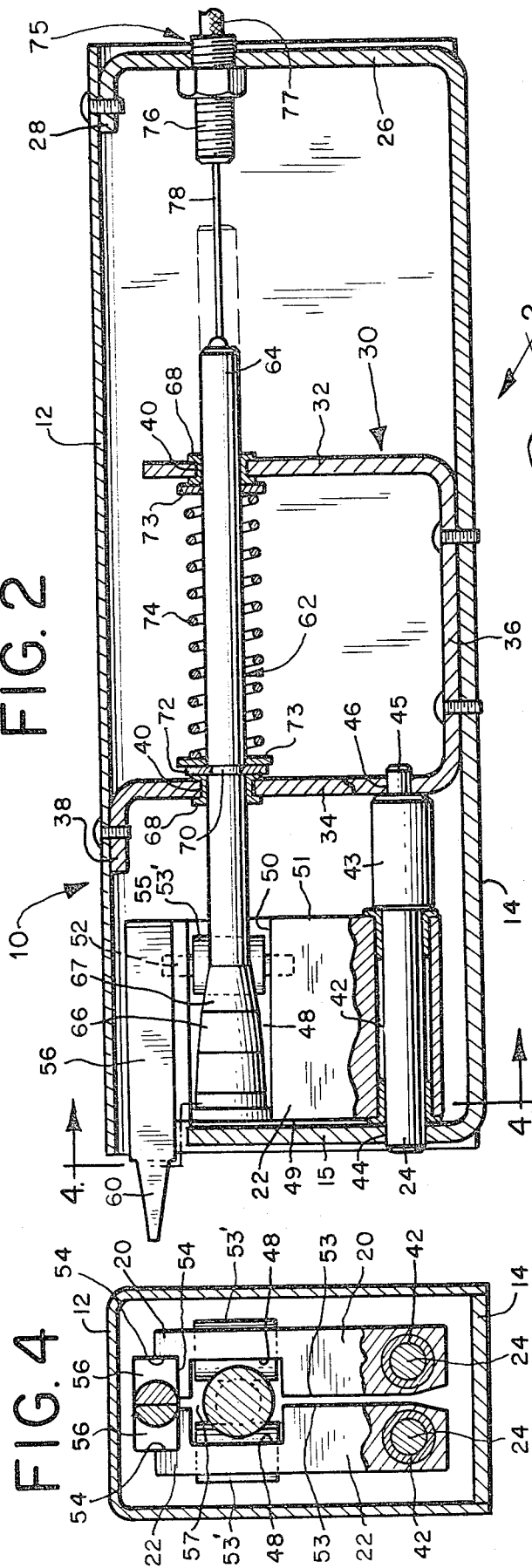
FIG. 2
FIG. 4
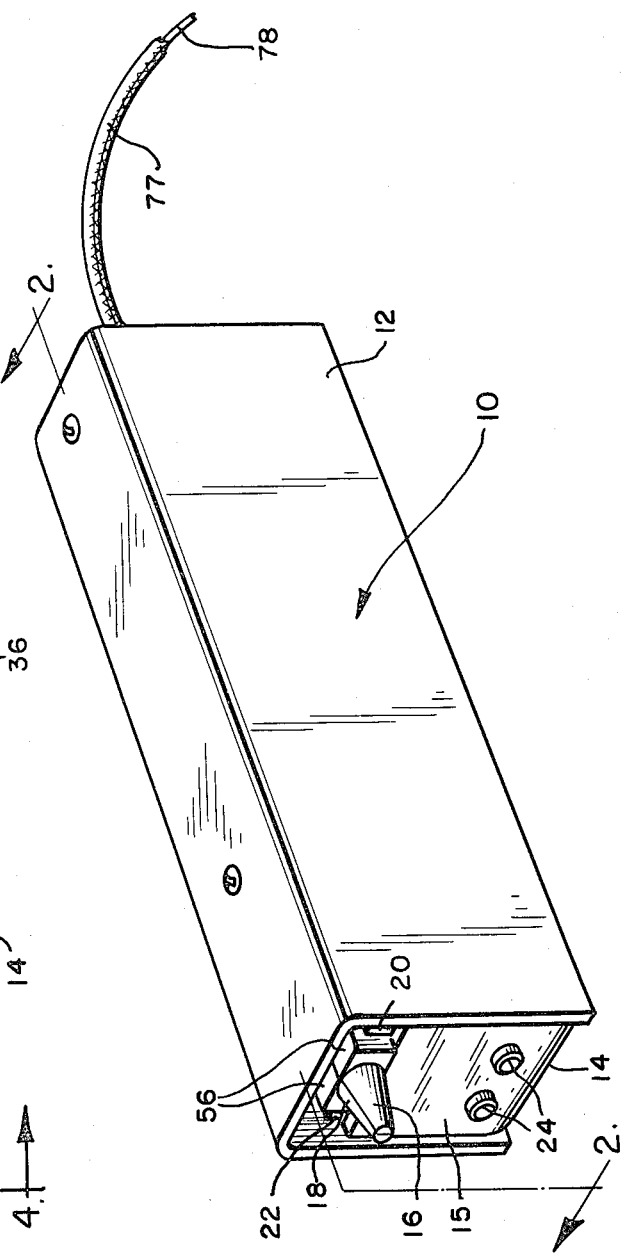
FIG. 1

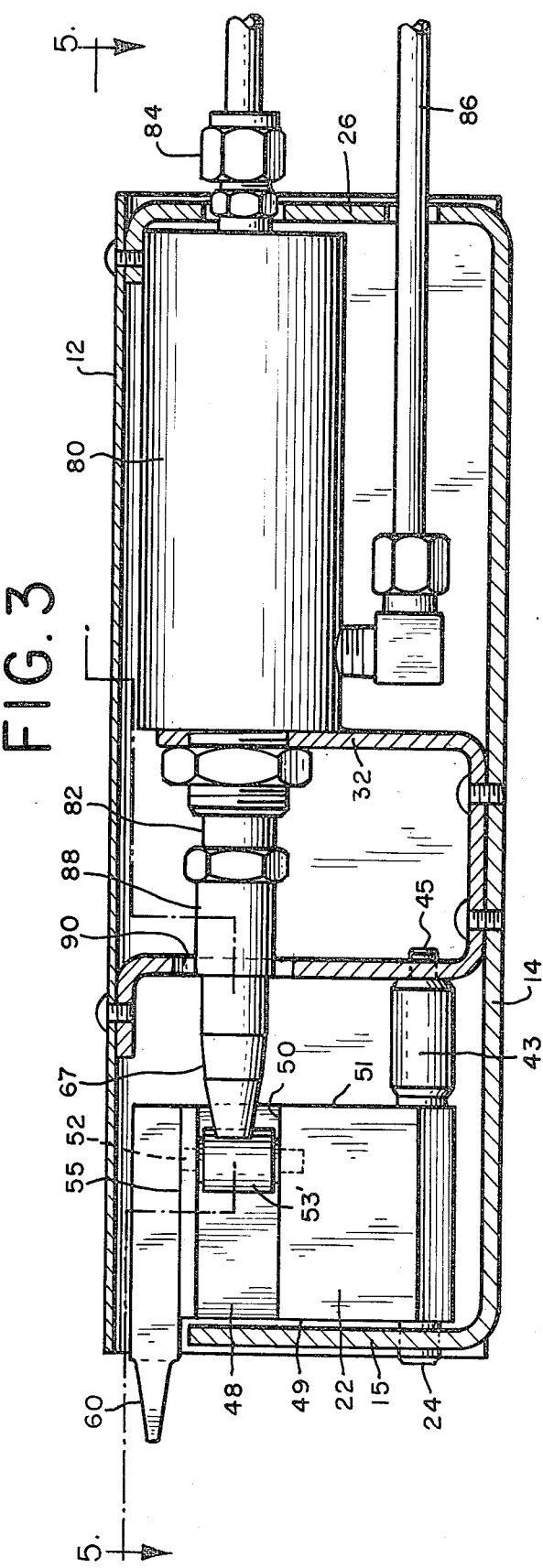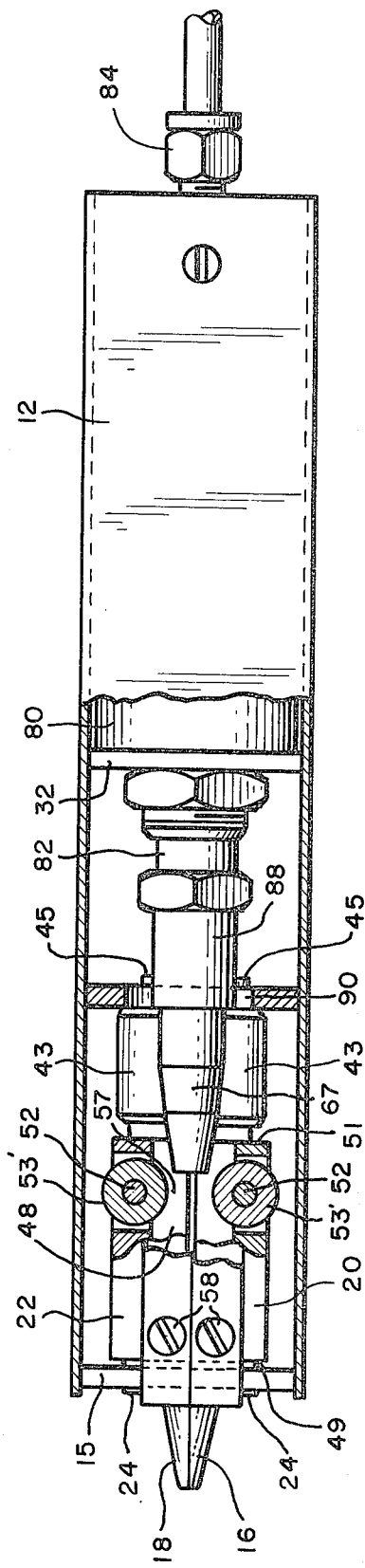

TUBE EXPANDER

BACKGROUND OF THE INVENTION

The present invention relates to devices for expanding flexible tubes and similar elastic articles and, more particularly, to a device which may be mechanically, hydraulically, or air activated.

Tube expanding and stretching devices are well known in the prior art. They generally include a plurality of cooperating fingers which are inserted into a flexible tube or elastic article and subsequently spread in relation to one another to expand the tube or article. The spreading of the fingers can be accomplished by a variety of mechanical arrangements which include a direct mechanical cable drive, air or hydraulic cylinder drives, or hand lever drives. In most cases, however, the mechanical arrangements are complex or are not versatile enough to be used with a variety of elastic articles or tubes.

By way of example, there are known in the prior art, stretching devices which include multiple fingers driven by a pedal operated Bowden cable or by a hand operated lever mechanism. The mechanical linkage used to accomplish the spreading of the fingers includes rotating ring and pin arrangements coupled to the hand operated lever or to the Bowden cable drive mechanism. The construction of these devices does not allow for easy replacement or substitution of the particular drive mechanism and the complexity of the finger spreading arrangement invites time-consuming repair and replacement problems.

In other instances, the devices include simple two-finger, hand actuated, fulcrumed lever arrangements which can be easily maintained and repaired. Such devices, however, have limited application since they are not readily adaptable to articles of different size and cannot account for the changes in elasticity of such articles. Since they are hand-held, they are also not easily adaptable to other mechanical driving mechanisms.

Accordingly, the present invention has been developed to overcome the shortcomings of the above disclosed and similar devices and, more particularly, to provide an inexpensive and versatile tube spreading device.

SUMMARY OF THE INVENTION

In accordance with the present invention, a generally elongated rectangular housing includes at one end thereof, two opposed parallel blocks which are pivotally mounted for rotation about longitudinal axes extending along the length of the housing. The blocks are similarly constructed and each includes a finger projecting from one edge and extending from the end of the housing. Each finger is generally formed as one-half of a cone-like structure so that when the blocks are in the rest state (unactuated), the finger portions cooperate to form a truncated cone shape element. Each of the blocks also includes a cam follower surface which is located on an opposite edge of the block from the projecting fingers. A mounting bracket positions a symmetrical cam so that it extends between the blocks and engages the cam follower of each block. The cam is coupled to be actuated by a mechanical Bowden cable drive or by hydraulic or air cylinder drives.

In use, the cooperating fingers are first inserted into a flexible tube or elastic article. The cam is then moved along an axis extending longitudinally of the housing causing it to engage the cam followers so that the blocks are rotated away from one another. When this occurs, the fingers engage the inner tube or article walls and expand them as the fingers rotate away from one another with the blocks. The fingers and the drive mechanism can be changed to allow the device to be used with a variety of articles and tubes.

It is a feature of the present invention to provide a tube or article expanding device which is simple in construction and inexpensive in operation and repair.

It is another feature of the invention to provide a tube or article expanding device which may be used with a variety of different size tubes or articles.

It is further feature of the invention to provide a tube and article expanding device which employs a cam and cam follower coupling to cause article expansion.

Still another feature of the invention is to provide a tube and article expanding device which is easily modified to be operated by a plurality of drive mechanisms.

Yet another feature of the invention is to provide an article and tube expanding device which provides for easy access for repair and replacement of parts.

Other advantages and novel features of the invention will become apparent from the following detailed description when considered with the accompanying drawings wherein:

BRIEF DESCRIPTION OF THE DRAWINGS

FIG. 1 is a perspective view of the spreading device of the present invention.

FIG. 2 is a side sectional view taken along the line 2—2 in FIG. 1 and showing the device adapted to be driven by a Bowden cable.

FIG. 3 is a side sectional view taken along the line 2—2 of FIG. 1 and showing the device adapted to be driven by an air or hydraulic cylinder.

FIG. 4 is a front sectional view taken along the line 4—4 in FIG. 2.

FIG. 5 is a partial top cut-away view of the device shown in FIG. 3.

DETAILED DESCRIPTION OF THE PREFERRED EMBODIMENTS

Turning to FIG. 1, the spreading device is generally shown to have a housing 10 which is formed from a U-shaped cover 12 attached to a mounting plate 14. The mounting plate 14, as more particularly described below, includes a front member 15 which acts to substantially close one end of the housing. Cooperating fingers 16 and 18 are attached to their respective blocks 20 and 22, which in turn pivotally mounted to the mounting plate 14 by shafts 24. As shown in its rest state, the cooperating fingers each form one-half of a cone-like member which extends into the tube prior to expansion. The shape of the fingers can be configured in any manner to accommodate various structures as are known in the prior art.

Referring now to FIG. 2, there is shown one embodiment of the spreading device of FIG. 1 which is adapted for use with a Bowden cable drive. In this embodiment, the mounting plate 14 of the housing 10 includes an upstanding forward member 15 and an upstanding rear member 26. The cover 12 can be attached to the mounting plate 14 along the flanged edge 28 of the rear member 26. Any conventional fastener such as a screw or bolt may be used to secure the cover 12 to the edge 28.

A U-shaped support bracket 30 having upstanding parallel side plate members 32 and 34 connected by a horizontal plate member 36, is positioned within the housing 10 so that member 36 abuts the surface of plate 14. The mounting plate 14 may be secured to member 36 by screws, bolts or other conventional fasteners. The cover 12 may also be attached to the flanged edge 38 of bracket 30 for further support by screws or other conventional fasteners. The supporting bracket 30 also includes openings 40 in the upstanding members 32 and 34 which are axially aligned along a longitudinal axis generally parallel to the mounting plate 14. The openings 40 act to guide the cam used for spreading the fingers as will be more particularly described below.

Turning now to FIGS. 2 and 3, parallel opposed rectangular blocks 20 and 22 are located at the forward end of the housing 10 adjacent to the member 15. Each block is a mirror of the other and includes a channel 42 having an axis extending generally parallel to the mounting plate 14 and perpendicular to plate portion 15 as well as parallel to the same axis in the opposite block. In the present instance, the channels 42 are cylindrical and cooperate with cylindrical shafts 24 extending therethrough. At one end, the shaft 24 extends through an opening 44 in the end member 15 of the mounting plate 14. The opposite end of the shaft 24 is coupled through a spring biasing mechanism 43 and its end 45 extends through an opening 46 in member 34 of the bracket 30. As can be seen, the shaft 24 cooperates with each block 20 and 22 so that each block can rotate on its shaft 24 about the axis extending through channel 42. In addition, both shafts 24 lie in the same plane parallel to mounting plate 14 so that each block is positioned in parallel opposed relation to the other and rotates symmetrically from the interface of the two blocks, but in the opposite direction. In addition, the spring mechanism 43, which may be of any conventional type, is constructed to allow rotation of each block upon the application of force but biases the block so that the blocks return to the parallel opposed position in the rest state.

Each block also includes a U-shaped channel 48 which extends between the block edges 49 and 51 along the opposed faces 53 of each block and substantially parallel to plate 14. A channel 50 is cut in each block edge 51 to form an opening in the block edge intersecting and perpendicular to the channel 48. A cylindrical roller 53 is mounted within the channel 50 and held therein for rotation about an axis perpendicular to the channels 42 and 50 by a pin 52 extending through the top edge 55 of each block and across the channel 50 into the body of the block. The cylindrical rollers 53 are dimensioned so that there is a uniform space 57 between them when the blocks 20 and 22 are in the rest state.

Along the inside of the top edge 55 of each block is an L-shaped channel 54 which extends between the edges 49 and 51 of each block 20 and 22. Finger support blocks 56 are mounted to extend transverse to blocks 20 and 22 in channel 54 and attached thereto by screws 58 (FIG. 5) or other conventional fasteners. In the present instance the finger support blocks generally have a square-like cross sectional configuration with a finger 60 projecting from one end thereof. In this particular example, each finger 60 has the general shape of one-half of a truncated cone so that when the blocks 20 and 22 are in parallel opposed relation to one another, the finger 60 of each block cooperates with the finger 60 of the other block to generally form a truncated cone projection extending beyond member 15 from the forward portion of the housing. Although the shapes of the finger supports and fingers themselves have been specifically identified for description herein, it is apparent that other shapes could be employed in accordance with the teachings. In particular, the fingers 60 can be selected from a variety of shapes and sizes depending upon the application. Naturally, by removal of the supporting blocks 56 with screws 58, the fingers can be easily interchanged.

Referring again to FIG. 2, a cam 62 extends along the horizontal axis through openings 40. As shown, the cam 62 comprises a cylindrical shaft portion 64 having a truncated cone portion 66 attached to one end thereof and having a tapered camming surface 67. The portion 66 is located so that it extends symmetrically into the channels 48 between the blocks 20 and 22. Naturally, the portion 66 and the channels 48 are dimensioned so that the block faces 53 are adjacent and substantially parallel to one another in the rest state. The dimensions of the shaft 64 are also set so that the shaft 64 extends symmetrically through the space 57 between the cylindrical rollers 53.

Flanged bushings 68 are located in the openings 40 and provide a cylindrical bearing surface enabling sliding movement of the shaft 64 along the horizontal axis therebetween. A U-shaped groove 70 extends circumferentially about the shaft 64 in a portion adjacent the truncated cone 66. A washer 72 or other suitable retainer is located in groove 70 and forms a surface which abuts against the flanged bushing 68 in member 34 when the mechanism is in the rest state. The groove 70 is positioned so that in the rest state the truncated cone portion 66 is symmetrically located in channels 48 and the faces 53 are adjacent and parallel. Washers 73 are located along a portion of the shaft 64 between the upstanding members 32 and 34. A spring 74 extends between the washer elements 73 and abuts against each of them. The spring is constructed to apply a force to the shaft through washers 72 and 73 so that washer 72 abuts bushing 68 in member 34. In FIG. 2, the expanding device is driven by a conventional Bowden cable 75. The cable 75 includes an outer covering 77 which extends through member 26 and is retained by a conventional nut clamp 76 attached to member 26. The inner cable 78 is attached to the opposite end of the shaft 64 by any conventional means.

The operation of the device can now be described with reference to FIG. 2. In the rest state, the blocks 20 and 22 are biased by spring mechanisms 43 so that the block faces 53 are substantially parallel and abutting. In this state, the fingers 60 are also together and cooperate to form the finger projection which is to be inserted into a tube or elastic article as is well known in the art. Also in the rest state, the spring 74 causes the shaft 64 and truncated cone 66 to be biased in a position so that the cone 66 is located within the channels 48, but does not cause the block faces 53 to be in a non-parallel position. After the fingers have been inserted into the tube or article to be expanded, a force can be applied to the inner cable 78 by a foot pedal or other conventional mechanical mechanism to move the shaft 64 in the bearings 68 so that it moves along the axis extending through the openings 40. This movement causes the narrow end of the truncated cone 66, and therefore the camming surface 67, to engage the cylindrical rollers. Naturally, as the shaft 64 continues to move and the taper increases, the camming surface 67, bearing against the cylindrical rollers attached to blocks 20 and 22, causes the blocks 20 and 22 to rotate about the axis of shaft 24 and move away from one another. When this happens, the fingers 60 extending from supports 56 also rotate away from one another and engage the inner walls of the tube or other elastic article. As the Bowden cable continues to move the shaft 64, the increasing taper surface 67 causes the blocks to be moved even further apart, thereby expanding the tube or other elastic article. Naturally, by controlling the amount of taper of the surface 67, the spreading distance can also be controlled.

After the article has been expanded to its desired size, the fingers can be moved by releasing the force on the Bowden cable and thus on shaft 64. At this time, the spring 74 abutting against washers 73 will cause the shaft 64 and cone 66 to return to its rest position. At the same time, the spring mechanism 43 will cause the blocks 20 and 22 to be rotated together so that the faces 53 are again parallel. The fingers can then be removed and the spreading device is ready for another use.

Turning now to FIG. 3, another embodiment of the invention is shown which is adapted to be used with air or hydraulic cylinder drives. The structure of the embodiment is similar to that of FIG. 2 and like numerals are used to identify like elements therein. Since the structures are substantially the same, only those differences will be described which are necessary for an understanding of its operation.

In this instance, because the use of an air or hydraulic cylinder drive is desired, an air or hydraulic cylinder 80 is located in the housing 10. The cylinder (of any conventional type) is mounted between member 26 and member 32 of support bracket 30 so that its power shaft 82 extends for movement along a longitudinal axis similar to shaft 64 in FIG. 2. The member 26 can be adapted to accommodate the linkages 84 and 86 necessary for providing air or hydraulic fluid. Since the linkages and the adaptions necessary to accommodate them are well known, they will not be described in detail. The support bracket 30, however, is modified to accommodate the cylinder 80 as well as a modified cam 88. In this instance, the cam is also formed similar to the truncated cone 66 in FIG. 2, but is located on the shaft 82 so that the larger base of the cone is attached to the moving shaft 82 and the narrow portion, in the rest state, is adjacent the opening 57 between the cylindrical rollers 53. The shaft 82 is positioned so that, upon movement, the truncated cone 88 is forced into the opening 57 and channels 48 through opening 90 in member 34. In all other respects, the structure and operation is identical to FIG. 2.

In operation, the hydraulic or air cylinder drive initially maintains the cone adjacent the cylindrical rollers so that the block faces 53 are in the parallel opposed relation similar to the embodiment of FIG. 2. Upon actuation, the cylinder 80 causes shaft 82 to move the truncated cone 88 into the opening 57 causing the surface of the cone 88 to engage the cylindrical rollers and likewise causing the blocks 20 and 22 to rotate away from one another. As can be seen, the same movement of the blocks as was described in FIG. 2, causes the fingers 60 to expand the tube or elastic article. After the article has been expanded, the drive is reversed to withdraw the cone 88, thereby allowing spring mechanisms 43 to return the blocks to their rest position.

As can be seen from the above descriptions, the present invention provides a spreading and expanding device which is easily adaptable for use in a variety of circumstances and conditions. With only a simple interchange of parts, the fingers can be easily changed to accommodate different sizes and different tubes. Likewise, with the simple substitution of a modified bracket 30, the drive mechanism can be easily interchanged to accommodate Bowden cable, air or hydraulic cylinder drives. Since the housing enables the easy replacement of such parts, the device becomes very versatile and can be used for a variety of tubes and conditions. Further, the device is simply and inexpensively constructed so that repair and replacement costs are lowered. All of these are advantages and features that are unrecognized in the prior art.

While the device has been described with particular reference to the use of cylindrical shafts, cones and finger elements, it is apparent that the shapes can be modified to provide similar operation and function in accordance with the teachings of the present invention. Likewise, in the present instance, it is contemplated that the elements are constructed of metal for strength and durability, but obviously other materials could be used consistent with their function in the device. Obviously, many other modifications and variations of the present invention are possible in light of the above teachings. It is therefore to be understood that within the scope of the appended claims, the invention may be practiced otherwise than as specifically described.

I claim:

1. Apparatus for expanding flexible members comprising:
    a housing;
    first and second block means each pivotally mounted within said housing for rotation about an axis;
    finger means coupled to each block means and extending from said housing transverse to each said block means for engagement in a flexible member;
    cam follower means separate from said finger means and coupled to each of said block means for providing a camming surface; and
    cam means supported for movement within said housing and coupled to engage said cam follower means for rotating each of said first and second block means about its axis.

2. The apparatus of claim 1 wherein said cam follower means comprises first and second cylindrical rollers coupled to respective ones of said first and second block means for engaging said cam means.

3. The apparatus of claim 1 wherein said finger means includes a finger support block removably coupled to each of said block means and a finger projecting from said finger support block for engaging a flexible member.

4. The apparatus of claim 1 wherein said housing means includes a mounting plate and a removable support bracket coupled to said mounting plate for supporting said cam means for movement.

5. The apparatus of claim 4 further including a Bowden cable having an outer cable portion attached to said mounting plate and an inner cable portion coupled to move said cam means.

6. The apparatus of claim 4 further including a hydraulic or air cylinder supported within said housing by said support bracket and mounting plate and coupled to move said cam means.

7. Apparatus for expanding flexible members comprising:

a housing including a mounting plate, and a removable support bracket coupled to said mounting plate;

first and second block means each pivotally mounted within said housing for rotation about an axis, each of said block means including a generally rectangular block having a shaft extending therethrough, said shaft being coupled to said mounting plate and support bracket for rotation of the block about the axis of the shaft;

finger means coupled to each block means and extending from said housing transverse to each said block means for engagement in a flexible member;

cam follower means coupled to each of said block means for providing a camming surface; and cam means supported for movement within said housing and coupled to engage said cam follower means for rotating each of said first and second block means about its axis, each of said block means being symmetrically supported in said housing so that the said faces are substantially opposed and parallel and said fingers are in adjacent opposed relationship.

8. The apparatus of claim 7 wherein each block includes a channel extending generally across a face of said block and said cam means extends within said channels during movement and engagement with said cam follower means.

9. The apparatus of claim 7 wherein each block means further includes spring means for biasing said block against rotation about the axis of said shaft.

10. An apparatus for expanding flexible members comprising;

a housing including an elongated mounting plate having upstanding front and rear plate members at opposite ends thereof and a cover coupled over said mounting plate;

a removable support bracket attached to said mounting plate and including first and second upstanding parallel plate members positioned parallel to the front and rear members of said mounting plate;

first and second rectangular blocks each having a first channel extending between opposite edges thereof;

a shaft retained in said first channel of each block and coupled to said front plate member and one upstanding member of said supporting bracket, said shafts being coupled to position said blocks so that the faces of each block are in opposed parallel relation to one another;

a second channel extending across the face of each block on the said opposed parallel faces;

a finger support removably attached to an edge of each block in opposed relation to the other;

a finger coupled to each finger support and projecting from said housing, said fingers being coupled so that each is adjacent the other;

a cam follower coupled to each block adjacent the said second channel and in spaced parallel opposed relation to one another;

an opening extending through each of said parallel plate members of said support bracket, said openings being aligned to form an axis which is substantially perpendicular to said plate members; and cam means supported by said support bracket and extending for slidable movement through at least one of the openings in said parallel plate members of said support bracket, said cam means including a symmetrical tapered camming surface positioned for movement and engagement with each of said cam followers; and means for maintaining said blocks in opposed parallel relation and resisting rotation of each block about the axis of its shaft.

11. The apparatus of claim 10 wherein said cam means includes a shaft extending through both of said openings in said parallel plate members of the support bracket, said tapered camming surface being attached at one end of said shaft and positioned within the second channel of each of said blocks, and further including a Bowden cable having an outer cover attached to said mounting plate and an inner cable attached to the other end of said shaft and means for moving said Bowden cable to cause said tapered camming surface to move against each cam follower and rotate the blocks away from one another.

12. The apparatus of claim 10 wherein said cam means includes a base with said symmetrically tapered surface extending from said base and adjacent the cam followers of each block and further including a hydraulic cylinder coupled to said support bracket and said mounting plate within said housing, said hydraulic cylinder including a shaft coupled to the base of said cam means to move said tapered surface into contact with the cam follower of each block and cause rotation of the blocks away from one another.

* * * * *